Sept. 8, 1953 — N. R. BENHAM — 2,651,561
PRODUCTION RECORDING INSTRUMENT
Filed July 1, 1948 — 3 Sheets-Sheet 1
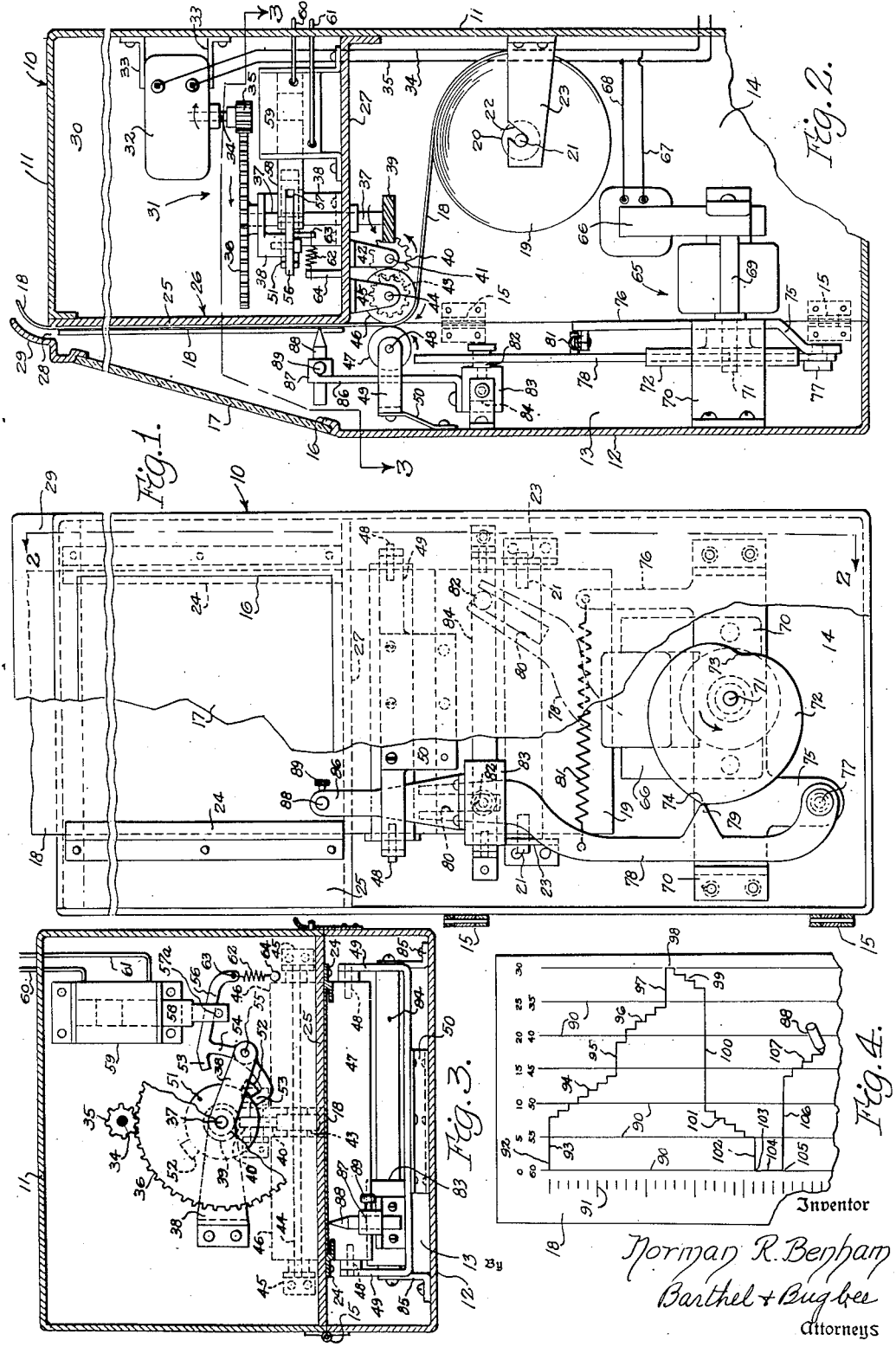
Inventor
Norman R. Benham
Barthel + Bugbee
Attorneys Sept. 8, 1953          N. R. BENHAM          2,651,561

PRODUCTION RECORDING INSTRUMENT

Filed July 1, 1948          3 Sheets-Sheet 2

Inventor
Norman R. Benham
Barthel & Bugbee
Attorneys

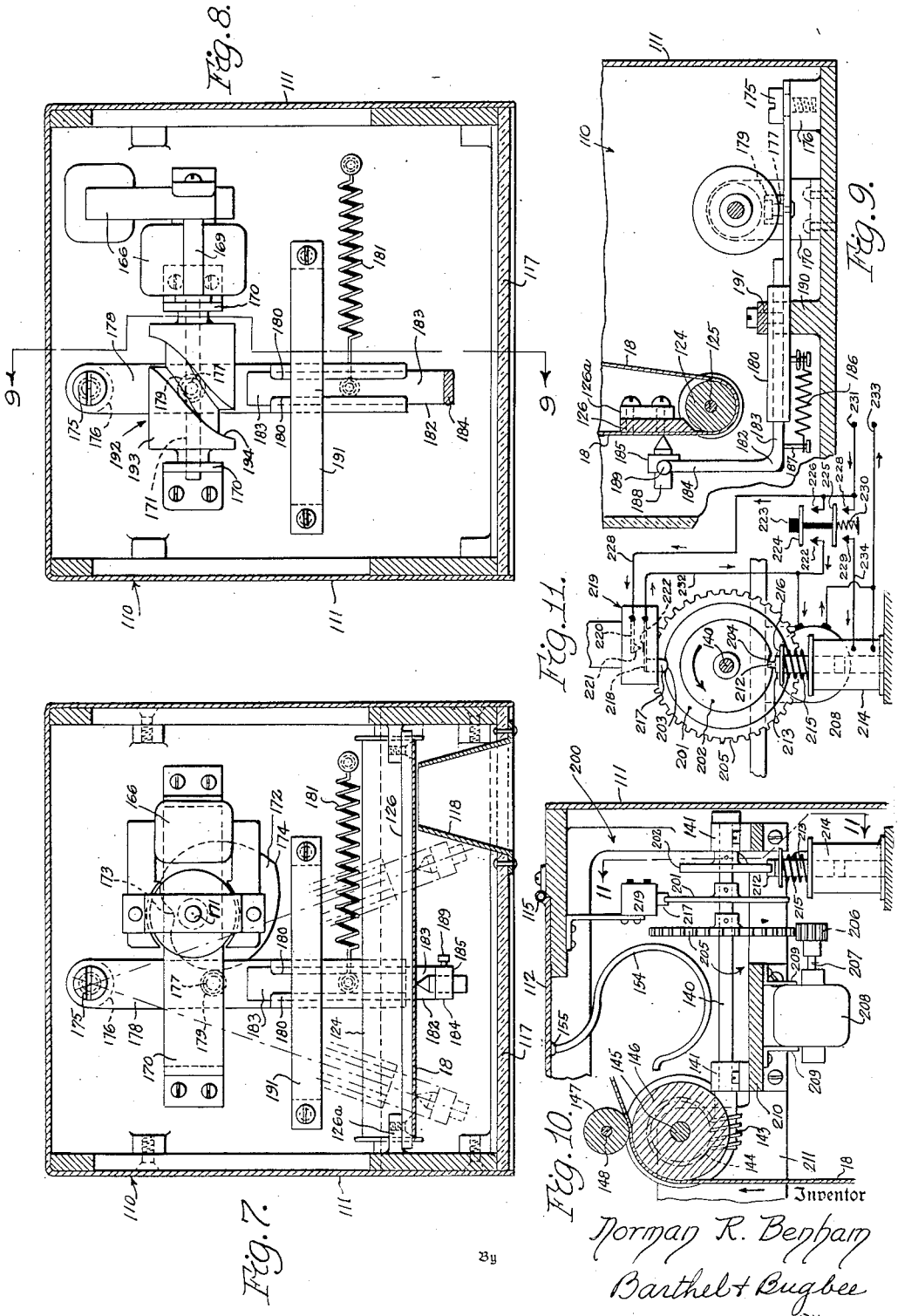

Patented Sept. 8, 1953

2,651,561

UNITED STATES PATENT OFFICE 2,651,561

PRODUCTION RECORDING INSTRUMENT

Norman R. Benham, Detroit, Mich.

Application July 1, 1948, Serial No. 36,520

2 Claims. (Cl. 346—119)

This invention relates to recording instruments and in particular to production recording instruments.

One object of this invention is to provide a production recording instrument wherein idle time of the machine will be instantly shown upon a moving record strip and wherein attempted concealment of the idle period by the operator is detected at a glance.

Another object is to provide a production recording instrument wherein an unusually large amount of production is capable of being recorded, piece by piece, upon a relatively short record strip, so that the record strip may be easily and conveniently filed or consulted because of its relatively short length in comparison to prior record strips or charts.

Another object is to provide a production recording instrument wherein a recording pen, pencil, stylus or the like is moved at a uniform speed to and fro across a record strip which itself is moved step-by-step every time a workpiece is produced by the machine or, in some instances where keeping track of the individual piece is unimportant, by multiples of pieces such as, for example, every five or ten pieces.

Another object is to provide a production recording instrument wherein the production record appears as an elongated strip of paper or other suitable material which may be either continuously rolled or zig-zag folded, the production being indicated by a stepped line traced on the paper by a suitable stylus or tracer.

Another object is to provide a production recording instrument which will show the number of pieces produced, the precise time at which each piece was produced, the length of time required to produce each piece, any interruptions both as to duration and time of occurrence, and any attempt by the employee to operate instrument manually at great rapidity in order to cover up the idle time.

Another object is to provide a production recording instrument of the above-mentioned character wherein the recording stylus or tracer is moved across the record strip at a uniform speed by time mechanism, is then reversed and again travels at a uniform speed back across the record strip until it reaches the opposite edge, whereupon it is again reversed to resume its original travel across the record strip, the latter being advanced meanwhile step-by-step as each workpiece is produced, thereby giving a continuous record of production on a relatively compact record strip.

In the drawings:

Figure 1 is a front elevation of a production recording instrument according to a preferred form of the invention, with the casing door broken away to disclose the internal mechanism;

Figure 2 is a vertical section along the line 2—2 in Figure 1;

Figure 3 is a horizontal section along the line 3—3 in Figure 2;

Figure 4 is a diagrammatic view of a portion of a production record strip used with the instrument of Figure 1, showing a production record traced thereon by the stylus of the instrument;

Figure 7 is a horizontal section along the line 7—7 in Figure 5;

Figure 8 is a horizontal section similar to that of Figure 7, but showing a further modification of the stylus driving mechanism;

Figure 9 is a vertical section along the line 9—9 in Figure 8;

Figure 10 is a view similar to the upper part of Figure 6, but showing a still further modification of the record strip driving mechanism; and Figure 11 is a vertical section along the line 11—11 in Figure 10.

Figure 6:
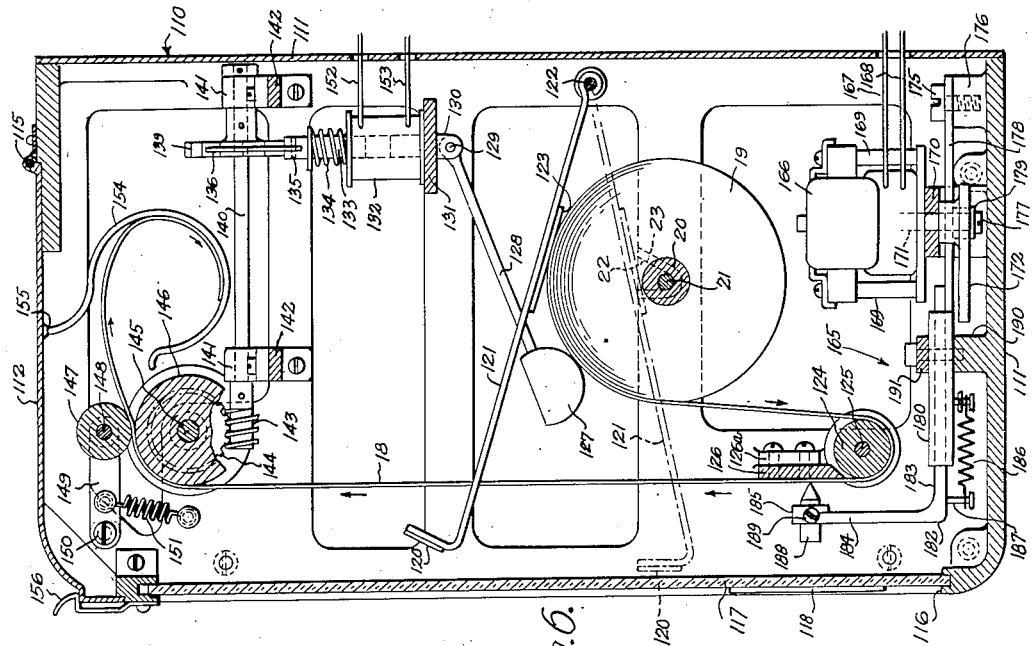
Figure 6 is a vertical section along the line 6—6 in Figure 5.

In industry, it has long been regarded as desirable to record the production of production machines such as punch presses, lathes, automatic screw machines and the like, and numerous efforts have been made to devise instruments satisfactory for this purpose. In prior instruments, however, the indication of production has often been unsatisfactory for various reasons. Instruments which use a circular disc for recording production give a record which is difficult to read and which is consequently slow in use and limited in the amount of production it will record. Circular discs also do not file easily in conventional filing cabinets because, unless the discs are small, they leave much waste space in a file folder. Other instruments which employ record strips moved by clockwork have also been found unsatisfactory because of the great length of record strip required to record a given quantity of production, and also because an unscrupulous machine operator after loafing on the job can manually operate a prior instrument to give a false record of machine production whose fraudulence is not readily detectable, if at all. Other prior instruments fail to record the time when each individual piece was recorded, or the length of time required to produce each piece. Still other instruments print a figure every time a piece is made but require a tremendous length of record strip for a large production.

The production recording instrument of the present invention eliminates these difficulties or shortcomings of previous instruments. The record strip of the present instrument shows not only the instant at which each workpiece was produced, but also the length of time which was required to produce it. Any interruption in the production rate of the machine is instantly shown on the record strip, and any attempts on the part of the operator to operate the instrument manually in order to cover up or conceal idle periods of the machine and give an apparent record of production are thwarted by the present instrument which shows both idle periods and speeded up operating of the instrument in an attempt to simulate the normal operation of the instrument by the machine. Since the record strips are elongated, with straight parallel edges, the record strip, when detached, is in the shape of an elongated rectangle which is easily folded and filed without wasting space in the filing cabinet, as in the case of the circular record discs. The elongated record strip produced by the present instrument is easy to read, and gives the required information at a glance, without the need for special instruments or skill in interpreting the results.

In general, the production recording instrument of this invention consists of a casing containing an elongated record strip of paper or other suitable material which is moved intermittently step by step in front of a stylus such as a pen or pencil, the record strip being operatively connected to a moving part of the production machine, such as, for example, a punch press, so that the record strip is moved one interval or step whenever a workpiece is produced or, in some instances of high rapidity production, a multiple number of such workpieces. The record strip is engaged by a stylus such as a pen or pencil, which is moved at a uniform rate across the record strip by accurate timing mechanism, such as by an electrical synchronous clock motor. When the stylus reaches one edge of the record strip, it is automatically reversed and moves uniformly back across the record strip to the opposite edge, and there again automatically reverses itself, and so on indefinitely. While the stylus is traveling in this manner, it traces out a straight horizontal line on the record strip. If production is going on at the same time, the instrument advances the record strip step by step for each workpiece produced so that, as a result, the stylus traces out a stepped line (Figure 4) while workpieces are being produced. When production ceases for any reason, however, the record strip is no longer advanced, hence the stylus traces out a straight line. The drawings show several different mechanisms, not only for moving the record strip step by step, but also for moving the stylus to and fro across the record strip.

*Production recording instrument with escapement feed for record strip*

Referring to the drawings in detail, Figures 1 to 3 inclusive show a preferred form, generally designated 10, of the production recording instrument of this invention, as housed in a box-like casing 11 having a box-like door 12 with a compartment 13 on the inside thereof communicating with the casing compartment 14, the door 12 being hinged as at 15 to the casing 11. The door 12 is also provided with a flanged opening or window 16 for receiving a transparent pane 17 of glass, plastic or the like, through which a record strip 18 can be observed from outside the casing 11. The record strip 18 (Figure 2) is in the form of an elongated ribbon wound in the form of a roll upon a core or mandril 20 having axle pins 21. The axle pins 21 are supported at the opposite ends of the core 20 in notches 22 formed in the ends of supporting brackets 23 of L-shaped form secured by suitable fasteners to the back of the casing 11.

The upper portion of the record strip 18 behind the pane 17 passes between flanged vertical guides 24 which overhang the lateral edges of the record strip 18 and hold it against a platen 25 formed by the front wall of a box-like partition 26 having a bottom portion 27 which is secured at its rearward edge (Figure 2) to the rearward wall of the casing 11. The record strip 18 passes out through a slot 28 in the top of the casing 11, and is there guided by a curved flange 29 on the top of the door 12.

The partition 26 in cooperation with the casing 11 encloses a chamber 30 (Figure 2) within which is mounted the record strip advancing mechanism generally designated 31. The mechanism 31 consists of a torque motor 32 mounted by angle brackets 33 upon the rear wall of the casing 11 and energized by electric conductors 34 and 35 from a suitable source of electric current, such as from an alternating current house lighting circuit. The motor 32 is of a type which can remain constantly energized while the armature shaft 34 thereof remains halted, without burning out the windings of the motor. The armature shaft 34 carries a pinion 35 meshing with a gear 36 on the upper end of a vertical shaft 37. The shaft 37 is journaled at its opposite ends in a bracket 38 and in the bottom partition wall 27 to which the bracket 38 is secured.

The lower end of the shaft 37 carries a helical gear 39 meshing with a helical gear 40 mounted on a shaft 41 supported in a bracket 42 mounted on the underside of the partition bottom wall 27 upon an axis at right angles to the axis of rotation of the shaft 37. The gear 40 in turn meshes with a gear 43 mounted on a shaft 44 journaled in a bracket 45 also secured to the underside of the partition bottom wall 27. The shaft 44 also carries a feeding roller 46 which frictionally engages the record strip 18 and moves it upward between the guides 24 and in front of the platen or partition front wall 25. The record strip 18 on the side opposite the roller 36 is engaged by a second roller 47 mounted upon axle pins 48 journaled in a U-shaped bracket 49 (Figure 3) supported by an arm 50 secured to the inside of the door 12.

The shaft 37 immediately beneath the bracket 38 carries an escapement wheel 51 (Figures 2 and 3) having diametrically opposite projections 52 engaged by prongs 53 upon an arcuate arm 54. The latter is mounted upon a shaft or pivot pin 55 which in turn is journaled in the bracket 38. The arm 54 is provided with an extension 56 which passes through a slot 57 and engages a pin 57a in the armature 58 of a solenoid 59. The solenoid 59 is mounted upon the partition bottom wall 27 and is connected by conductors 60 and 61 to a source of electric current (not shown)

containing a switch which is closed by a moving part of the machine each time a workpiece is produced by the machine. A coil spring 62 attached to a pin 63 extending downward from the outer end of the arm extension 56 (Figure 2) constantly urges the latter toward the front wall 25 of the partition 26. The opposite end of the spring 62 is secured to a pin 64 rising from the partition bottom wall 27.

The scriber driving mechanism 65, generally designated 65, occupies the lower and forward part of the casing 11 and door 12 of the instrument and is driven by an electrical synchronous clock motor 66 of a conventional pattern, the details of which form no part of the invention and which is energized by conductors 67 and 68 connected to the conductors 34 and 35. The motor 66 is secured by posts 69 to an approximately U-shaped bracket 70 which, in turn, is secured to the inside surface of the door 12. Mounted on the motor shaft 71 is a heart-shaped cam 72 with minimum and maximum peripheral points 73 and 74 located respectively at the nearest and farthest points from the axis of rotation. The bracket 70 is provided with downwardly and upwardly extending arms 75 and 76. Pivotally mounted as at 77 on the arm 75 is a scriber actuating lever 78 having a cam follower portion 79 engageable with the periphery of the cam 72 and also having a slotted upper end 80. The lever 78 is constantly urged to the right (Figure 1) by a coil spring 81 connected thereto and having its opposite end anchored to the upwardly extending arm 76. The slotted end 80 of the lever 78 engages a pin 82 mounted on and projecting horizontally from a slider 83 which, in turn, slides to and fro upon a square shaft 84 mounted on angle brackets 85 secured to the inside of the door 12. Extending upward from the top of slider 84 is an arm 86, the upper end of which is provided with a horizontally drilled boss 87 which holds a suitable stylus 88, such as a pen or pencil, the forward end or writing tip of which engages the surface of the record strip 18. The stylus 88 is held in position by a set screw 89.

In operation, the production recording instrument 10 is loaded with a roll 19 of record strip 18, the latter being threaded between the rollers 46 and 47 and upward between the guides 24 and out through the slot 28 in the manner shown in Figure 2. The record strip 18 is preferably ruled with longitudinally extending lines 90 representing suitable time intervals, such as five-minute periods, and also with transverse graduations 91 representing individual or multiple production units according to the workpieces produced by the machine whose production is to be recorded. When the production machine is started, assuming that the conductors 34, 35, 60, 61, 67, 68 have been energized from a suitable source of electricity, the timing motor shaft 71 starts rotating, rotating the heart-shaped cam 72 and consequently causing the lever 78 to move the stylus 88 to and fro across the record strip 18 at a uniform rate of speed, tracing out a record line or graph 92. The shape of the graph 92 will, of course, depend on the behavior of the machine and on the nature of the articles being produced, as well as upon the activities of the operator.

Let it be assumed that the machine is idle for the first 8 minutes; the stylus 88 will then trace out a straight horizontal section 93 of the graph 92 (Figure 4) until the machine starts turning out workpieces at the end of the eighth minute. When this occurs, the record strip 18 is moved upward intermittently step by step each time the workpiece or a given multiple of workpieces is produced, causing the graph 92 to exhibit a stepped portion 94. Let it be assumed that after the seventh workpiece has been produced, the machine remains idle for five minutes, whereupon the straight horizontal portion 95 of the graph will be produced. The horizontal portions of the steps in the stepped portion 94 will indicate by their lengths the length of time required by the machine to produce each workpiece, and the vertical portion of each step will show the exact time at which a particular workpiece was being counted. Thus, the stepped portion 96 indicates that five more workpieces were produced after the five minute halt 95, after which a six minute halt 97 was made. It will be seen that the second workpiece produced during the interval 96 required about twice the length of time to produce as the remaining workpieces, this being indicated by the double-width of the "tread" of the first step in this group.

At the end of the idle period 97, namely at 30 minutes after starting, the stylus reverses itself at the point 98, and at that instant the machine again starts producing and produces four workpieces, as indicated by the graph portion 99, after which the machine remains idle for approximately 18 minutes indicated by the horizontal portion 100 of the graph 92. Obviously, the horizontal portions 95 and 97 may also represent, not idle periods, but also excessively long periods in which a given workpiece is being produced.

At the end of the 18 minute period, indicated by the horizontal portion 100, the machine again starts producing regularly and produces five workpieces, as indicated by the stepped portion 101, after which an idle period or excessively long single unit working period 102 is recorded. At the end of this time, as at the point 103, the stylus would normally reverse its direction of motion as it did at the point 98. At the point 103, in Figure 4, however, the operator, seeking to cover up some of his idle time, apparently operated the production indicating switch on the machine three times in rapid succession, thereby producing the vertical record line 104 instead of a stepped line like the line 101 if the machine had been producing normally. Thus, the vertical line 104 of greater length than that accorded to a single unit of production, indicates an attempt at cheating by the operator. Such cheating attempts are at once indicated on the record strip 18, so that a dishonest operator is exposed. In the particular record being traced out by the stylus 88, following the attempt at cheating, the operator left the machine idle from the stylus reversing point 105 for about 14 minutes, as indicated by the horizontal line 106, after which he started producing regularly again, as indicated by the stepped portion 107.

*Modified production recorder with ratchet record strip feed*

Figure 5:
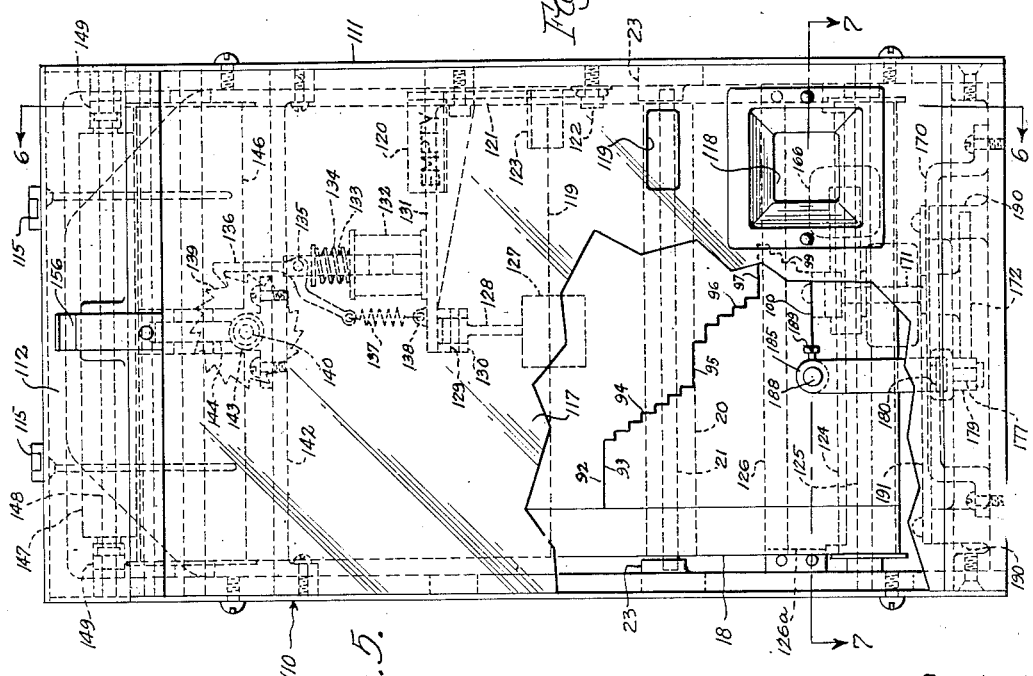
Figure 5 is a front elevation of a modified production recording instrument, according to the invention, with the casing door also broken away to disclose the internal mechanism.

The modified production recording instrument 110 shown in Figures 5, 6 and 7 is similar in principle to that shown in Figures 1 to 3 inclusive, particularly as regards the scriber drive, but differs in the details of the record strip feeding mechanism. The instrument 110 is provided with a box-like casing 111 having at the top a door 112 hinged as at 115 to the casing 111. The front of the casing 111 is provided with a flanged opening 116 for receiving a transparent pane 117 of glass, plastic or the like having a window portion extending vertically along the right-hand side thereof (Figure 5).

Substantially the same record strip is employed as in the form of the invention shown in Figures 1 to 3, hence the same reference numeral 18 is employed for it, with the same roll 19 upon the same core 20 and axle pins 21 supported in notches 22 in brackets 23 secured to the sides of the casing 111. The appearance of the record strip 18 and the record graph traced out by the scriber are also substantially the same as shown in Figure 4 except that a slightly wider strip is optionally employed so that in a blank column on the right-hand side of the strip explanations of the causes of idleness or stoppages of the machine can be entered directly upon the strip through a framed opening 118. The entries may be made by symbols representing different causes of idleness or stoppage, in order to conserve space. Above the framed opening 118 is a transparent window 119 in an otherwise opaque portion of the pane 117. Arranged to drop down to a level behind the window 119 is an indicator 120 bearing the word "empty" or the like mounted upon a bent arm 121, the opposite end of which is bent around a pivot member 122, such as a pivot screw threaded into the right-hand side wall of the casing 111. A contact plate 123 on the underside of the pivoted arm 121 bears against the top of the record strip roll 19 so that when the mandril or core 20 has become substantially empty, the indicator 120 will show in the window 119 and indicate to the operator or maintenance man that a new roll 19 must be installed.

The record strip 18 passes over a roller 124 mounted on an axle 125 journaled in the opposite side walls of the casing 111. The record strip then passes upward past a platen 126 secured at its opposite ends to bosses 126a extending inward from the opposite side walls of the casing 111. A weight 127 on the end of an arm 128 pivoted as at 129 to a bracket 130 prevents overrunning or excessive unrolling of the roll 19. The bracket 130 is secured to the underside of a shelf 131 which is secured to one of the side walls of the casing 111, and extends inward to approximately the center of the casing 111.

Also mounted on the shelf 131 is a solenoid 132, the armature 133 of which is constantly urged upward by a coil spring 134. Pivoted as at 135 to the slotted top of the armature 133 is a bell crank pawl 136, the lower arm of which is hooked to a coil spring 137 anchored as at 138 to the platform 131 (Figure 5). The upper arm of the pawl 136 is pronged and engages the teeth of a ratchet wheel 139 mounted upon a horizontal shaft 140 journaled in bearing brackets 141 fastened to shelves 142 extending between and secured to the opposite side walls of the casing 111. A worm 143 mounted on the outer end of the shaft 140 engages a worm wheel 144 mounted on a shaft 145 carrying a feed roller 146. A floating idler or pressure roller 147 mounted on an axle 148 which is secured in the outer ends of swinging arms 149 bears against the upper side of the record strip 18 and urges the latter against the feed roller 146. The arms 149 are pivoted as at 150 to the side walls of the casing 111 and are urged downward by one or more coil springs 151 connected between the arms 149 and the casing 111 (Figure 6). This causes the feed roll 146 to frictionally engage the record strip 18 with a sufficiently powerful grip to advance the strip 18 one step every time the production machine throws a switch (not shown) which energizes the solenoid 132 through the conductors 152 and 153 (Figure 6). The record strip 18 immediately after passing through the space between the rolls 146 and 147 enters a holder 154 of nearly circular cross-section which causes the strip to curl up into a roll and thereby to conserve space. The holder 154 is roughly in the form of a question mark in cross-section and has its upper portion secured as at 155 to the underside of the cover 112. A spring latch 156 yieldingly holds the cover 112 in position.

The stylus driving mechanism 165 is generally similar to the scriber driving mechanism 65 previously described in connection with Figures 1 to 3, except that the mechanism is for the most part mounted horizontally rather than vertically. The electrical synchronous clock motor 166 similar to the clock motor 66 of Figure 2 is similarly energized by conductors 167 and 168. The motor 166 is connected by posts 169 to a U-shaped bracket 170 mounted on the bottom wall of the casing 111 and having a motor shaft 171 carrying an asymmetrical cam 172 with minimum and maximum points 173 and 174. Pivotally mounted as at 175 on the lug or boss 176 rising from the bottom wall of the casing 111 is a scriber-actuating lever 178 (Figures 6 and 7). The latter carries a pivot pin 177 carrying a cam follower roller 179 engageable with the periphery of the asymmetrical cam 172. The outer or forward end of the scriber-actuating lever 178 is provided with opposed inwardly bent longitudinal flanges 180 forming a longitudinal guideway. The lever 178 is constantly urged to the right (Figure 7) by a coil spring 181 connected thereto and having its opposite end anchored to the bottom wall of the casing 111.

Slidably mounted in the guideway formed by the flanges 180 upon the scriber-actuating lever 178 is an L-shaped scriber arm 182 having a lower or horizontal arm 183 slidably mounted between the flanges 180 and also having a vertical arm 184 terminating in a boss 185. A coil spring 186 (Figures 6) connected to the pin 187 which extends downward from the horizontal arm 183 of the scriber arm 182 constantly urges the latter inward. The boss 185 is bored to receive a scriber 188 similar to the scriber 88 previously described and similarly held in position by a set screw 189. The scriber 188, which may be a pen or pencil, engages the record strip 18 and makes a mark on it while it is supported against the platen 126.

In order to guide the lever 178 as it swings to and from, the outer end of the lever 178 rests upon the upper surface of a rib 190 (Figure 6). Passing over the flanged portions 180 of the lever 178 is a bridge member 191 which serves as a retaining member to hold the parts in alignment.

The operation of the modified production recording instrument 110 is similar to that of the recording instrument 10 previously described. When the conductors 167 and 168 are energized so as to cause the timing motor 166 to start rotating, the asymmetrical cam 172 causes the scriber-actuating lever 178 to swing uniformly to and fro with a constant and uninterrupted motion, thereby tending to swing the scriber arm 182 and scriber 188 to and fro back and forth across the record strip 18 at a uniform rate the same as in the production recording instrument 10, similarly tracing out the graph 92.

When the production machine starts operating and completes each workpiece, the solenoid 132 is energized through the energization of the conductors 152 and 153, pulling down the armature 133 and pawl 136 and rotating the ratchet wheel 139 by one tooth. This rotates the shaft 140 and worm 143 a partial revolution, consequently rotating the worm wheel 144 and feed roll 146, thereby advancing the record strip 18 upward by one step or notch. This continues each time a workpiece is produced, as described in connection with the production recording instrument 10.

*Modified scriber-actuating mechanism with spirally-grooved cam*

The scriber-actuating mechanism generally designated 192 is generally similar to the scriber-actuating mechanism described in connection with Figures 5 to 7 inclusive, and similar parts are similarly numbered. In the modification shown in Figures 8 and 9, however, in place of the heart-shaped cam 172, the electrical synchronous clock motor 166 has its motor shaft 171 carrying a drum-shaped or cylindrical-shaped cam 193 with a spiral groove 194 engaging the cam roller 179 on the pin 177 of the scriber-actuating lever 178. The cam groove 194 is an endless spiral return groove which thereby causes the lever 178 and scriber 188 to swing to and fro at a uniform speed the same as with the heart-shaped cam 172. The operation of this modification is substantially identical with that described in connection with the scriber operating mechanism 165 previously explained, hence requires no further discussion.

*Modified record strip advancing mechanism*

Figures 10 and 11 show a further modified mechanism for advancing the record strip 18 step by step in response to the successive production of workpieces by the production machine. This modified record strip advancing mechanism, generally designated 200, is mounted in a casing 111 similar to that shown in Figures 5 and 6 and having a similarly hinged door 112 with a similar record strip holder 154 secured thereto. The shaft 140, bearing bracket 141, worm 143, wormwheel 144, shaft 145, feeding roll 146 and idler or pressure roll 147 on shaft 148 remain the same as in Figure 6 and are similarly designated. Figures 10 and 11, however, show a different mechanism for rotating the worm shaft 140 from the pawl and ratchet mechanism shown in Figures 5 and 6.

For this purpose, a pair of discs 201 and 202 are secured to the shaft 140 and are provided with peripheral notches 203 and 204 respectively. Also mounted on the shaft 140 and secured thereto is a gear 205 with which meshes a pinion 206 mounted on the armature shaft 207 of an electric motor 208. The electric motor 208 is suspended by brackets 209 from a shelf 210 secured to one of the sidewalls of the casing 211. The notch 204 in the periphery of the disc 202 is engaged by a projection or tooth 212 on the upper end of the armature 213 of a solenoid 214. The solenoid armature 213 is urged upward by a coil spring 215 arranged between the upper end of the solenoid 214 and a washer 216 mounted near the upper end of the solenoid armature 213. The notch 203 in the disc 201 is engaged by a flanger 217 mounted on the outer end of a spring lever or arm 218 of a switch 219 having a fixed arm 220 with a contact 221 thereon engageable with a contact 222 on the spring arm 218.

In order to energize the motor 208 and solenoid 214, a circuit such as is shown in Figure 11 is employed. This circuit includes a switch 223 operated by a moving part of the production machine (not shown) and having switch bars 224 and 225. When the machine has finished a workpiece, its moving part actuates the switch 223, depressing its switch bars 224 and 225 so that they engage and bridge the contacts 226, 227 and 228, 229 respectively against the urge of a coil spring 230. The closing of the switch 223 in this manner closes the circuit between the power line 231 and the line 232 leading to the motor 208, the circuit being completed by the power line 233 leading to the motor 208 and also to the solenoid 214. The bridging of the contacts 228 and 229 by the lower switch bar 225 momentarily closes the circuit between the power line 231 and the line 234 leading to the solenoid 214, so that the latter is energized at the same time as the motor 208. The energization of the motor 208 is also controlled by the switch 219 which, when closed, establishes a bridging circuit around the upper contacts 226, 227 so that this circuit will continue to be energized when the machine releases the switch 223.

In the operation of the modification shown in Figures 10 and 11, let it be assumed that the production machine has just finished a workpiece and consequently has closed the machine-operated switch 223, bridging the gap between the upper contacts 226, 227 and the lower contacts 228, 229. This action energizes the motor 208 and solenoid 214. The energization of the solenoid 214 causes its locking tooth 212 on the armature 13 to be withdrawn from the locking notch 204, thereby releasing the disc 202 and shaft 140 for free rotation. The energization of the motor 208 starts the shaft 140 and discs 201, 202 in rotation. As soon as the locking tooth 212 is withdrawn from the locking notch 204, the motor 208 causes the discs 201 and 202 to rotate, causing the notch 203 in the disc 201 to move away from the switch finger 217. The latter therefore rides up on the periphery of the disc 201 and closes the circuit between the contacts 221 and 222 of the switch 219. The closing of the switch 219 establishes a holding circuit which temporarily bridges the contacts 226 and 227 of the machine-operated switch 223, even though the latter is immediately released and opens. Thus, the motor 208 continues to rotate the shaft 140, worm 143, worm wheel 144 and feed roll 146, thereby advancing the record strip 18 one step past the scriber or stylus 188.

Meanwhile, the release of the machine-operated switch 123 immediately de-energizes the solenoid 214 by separating the contacts 228 and 229. As there is no bridging circuit for the solenoid 214, the armature 213 thereof is moved upward under the urge of the coil spring 215. By this time, however, the notch 204 has moved past the locking tooth 212 so that when the solenoid 214 is deenergized, the locking tooth 212 slides along on the periphery of the disc 202.

When the shaft 140 has been rotated one complete revolution by the motor 208, the switch finger 217 drops into the notch 203 which has now arrived opposite it. This causes the switch arm 218 and its contact 222 to move out of engagement with the contact 221, opening the circuit in the switch 219 and thereby de-energizing the holding circuit around the switch 223. This de-energizes the motor 208 and causes the shaft 140 to come to a halt. Meanwhile, the locking tooth 212 on the solenoid armature 213 has been pushed upward into the notch 204 in the periphery of the disc 202, locking the latter in position until the next actuation of the switch 223 by the completion of another work-piece.

What I claim is:

1. An instrument for recording upon a record strip the workpiece production of a machine, comprising a rotary record strip feeding member engageable with said record strip, normally inactive electric motive mechanism operatively connected to said feeding member to rotate the same, an electrically-operated control device including an escapement, said control device being connected to said mechanism and including a production-sensitive element adapted to be connected to a moving part of said machine and movable thereby intermittently in response to the completion of production of workpieces by said production machine for imparting a step-by-step operation to said electric motive mechanism, a stylus engageable with said record strip, a stylus support movable to and fro across said record strip transversely to the direction of travel thereof, and a timing device operatively connected to said stylus support and effective to move said stylus support at a uniform speed forwardly and reversely to and fro across said record strip whereby to trace out a stepped production record line on said record strip having the steps thereof representing the number of workpieces produced.

2. An instrument for recording upon a record strip the workpiece production of a machine, comprising a rotary record strip feeding member engageable with said record strip, normally inactive electric motive mechanism operatively connected to said feeding member to rotate the same, an electrically-operated control device including an escapement and an operating electro-magnet therefor, said control device being connected to said mechanism and including a production-sensitive element adapted to be connected to a moving part of said machine and movable thereby intermittently in response to the completion of production of workpieces by said production machine for imparting a step-by-step operation to said electric motive mechanism, a stylus engageable with said record strip, a stylus support movable to and fro across said record strip transversely to the direction of travel thereof, and a timing device operatively connected to said stylus support and effective to move said stylus support at a uniform speed forwardly and reversely to and fro across said record strip whereby to trace out a stepped production record line on said record strip having the steps thereof representing the number of workpieces produced.

NORMAN R. BENHAM.

References Cited in the file of this patent

UNITED STATES PATENTS

| Number | Name | Date |
|---|---|---|
| 1,234,708 | Aberegg | July 31, 1917 |
| 1,282,125 | Pickering | Oct. 22, 1918 |
| 1,443,732 | Cook | Jan. 30, 1923 |
| 1,550,804 | Harris | Aug. 25, 1925 |
| 1,583,536 | Egy et al. | May 4, 1926 |
| 1,708,972 | Lanphier et al. | Apr. 16, 1929 |
| 1,754,503 | Dwelle | Apr. 15, 1930 |
| 2,085,224 | Krueger | June 29, 1937 |
| 2,192,656 | Stone et al. | Mar. 5, 1940 |
| 2,390,178 | Rutherford | Dec. 4, 1945 |
| 2,395,658 | Disney | Feb. 26, 1946 |
| 2,435,260 | Wise et al. | Feb. 3, 1948 |